Nov. 23, 1943.   C. H. SCHURR   2,335,215
GEAR CUTTING MACHINE
Filed April 5, 1932   2 Sheets-Sheet 1
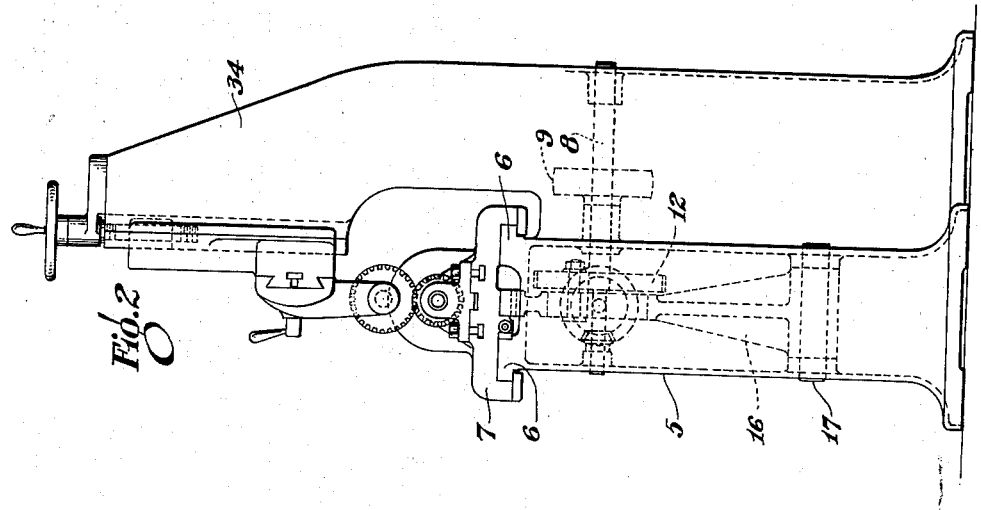
INVENTOR.
Charles H. Schurr
BY
Hawgood and Van Horn
ATTORNEYS

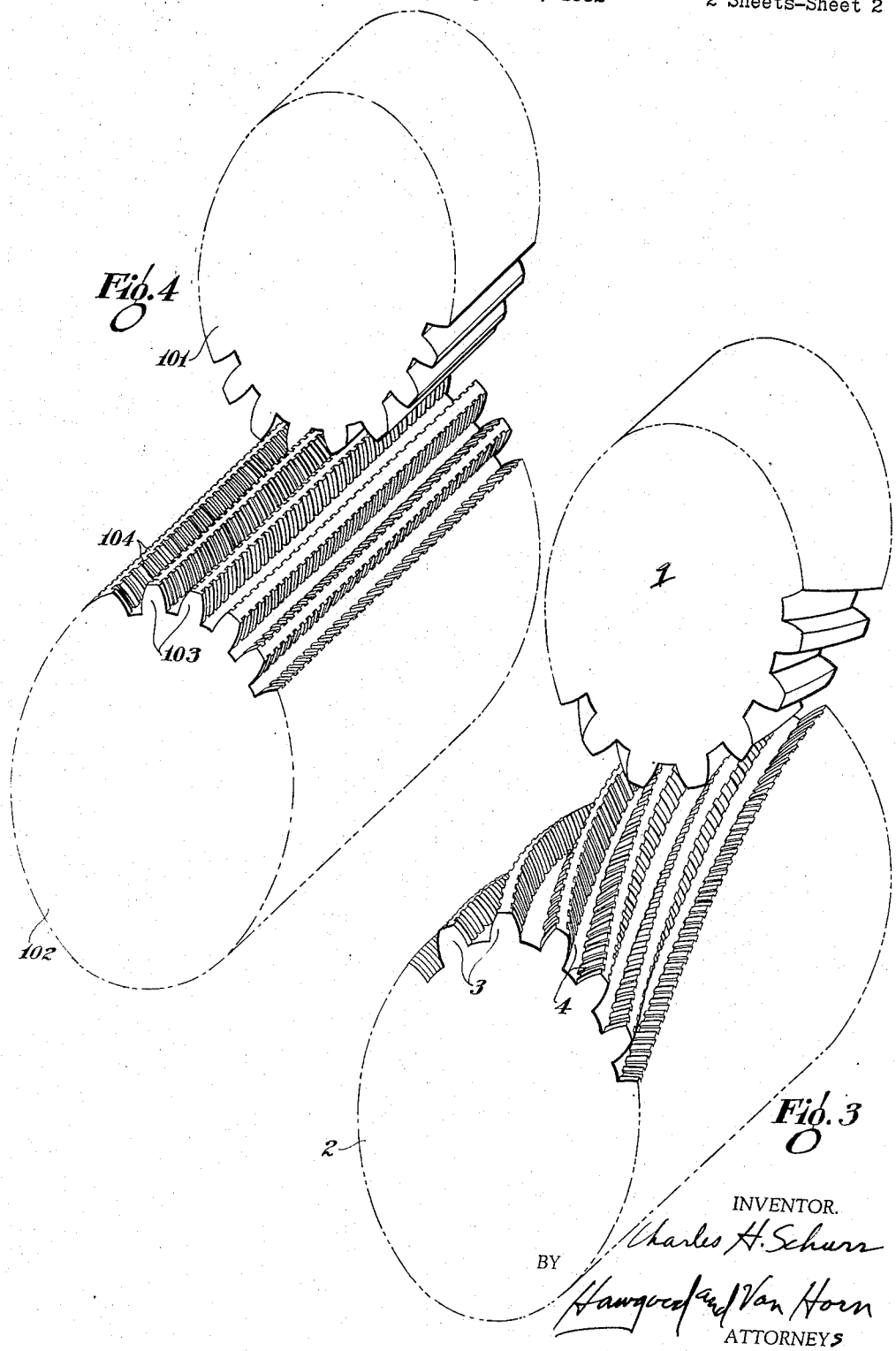

Patented Nov. 23, 1943

2,335,215

UNITED STATES PATENT OFFICE 2,335,215

GEAR CUTTING MACHINE

Charles H. Schurr, Cleveland, Ohio, assignor to The Lees-Bradner Company, Cleveland, Ohio, a corporation of Ohio Application April 5, 1932, Serial No. 603,366

1 Claim. (Cl. 90—1.6)

This invention relates to a machine for finishing gear teeth or other grooved articles.

An object of the invention is to provide an improved method of finishing the surfaces of gear teeth, splines and other surfaces in grooved articles.

Another object is to provide an improved method of finishing surfaces of such articles which may be simply performed.

Another object is to provide an improved method of finishing surfaces of such articles which will be very accurate.

Another object is to provide an improved mechanism for finishing the surfaces of such articles.

Another object is to provide an improved tool for use upon the surfaces of such articles.

Other objects will hereinafter appear.

The invention will be better understood from the description of two practical embodiments thereof, illustrated in the accompanying drawings, in which:

Figure 1 is a front elevational view of a machine arranged for finishing the teeth of helical gears.

Figure 2 is a side elevational view of the machine of Figure 1.

Figure 3 is a somewhat diagrammatic view of the work and tool of Figures 1 and 2; and Figure 4 is a view similar to Figure 3 showing a tool used for finishing the teeth of a spur gear.

Heretofore, gear teeth have been finished by rolling a blank, in which the teeth that are to be finished have been roughed out, as though it were in mesh with a tool having working surfaces in the shape of the teeth of a gear with which the gear to be produced would mesh, the metal of the blank being either worn away by the use of an abrasive, as in a lapping operation, or displaced or swaged into a finished form. Such methods and apparatus for performing them are well illustrated in my prior Patents Nos. 1,642,179, 1,697,823, 1,712,095, and 1,745,344; and it is now understood that if a tool having involute shaped teeth be rolled in contact with the teeth of a blank, it may be used to produce upon the teeth of the blank corresponding or conjugate involute surfaces, and that these surfaces, formed, as they are, by the generative action of the teeth of the tool, are much more accurate in contour than would teeth produced by a formed tool designed to fit the spaces between the teeth.

In the illustrated application of the present invention a tool is provided which in cross-section corresponds exactly to a gear which would mesh with the gear it is desired to produce. This tool is of a length considerably in excess of the blank on which it is to operate.

In Figure 3 a work gear or blank in which teeth have been cut is indicated at 1, this blank meshing with a tool indicated generally at 2, the gear and blank having helical teeth of the same helix angle. The teeth 3 of the tool have formed in each of their side surfaces a series of sharp cornered grooves 4, the grooves, if desired, being undercut so that the outer corners will be acute.

In operation, the blank is placed in mesh with the tool, and one or the other driven to rotate both. Of course, both may be driven and they may be positively geared together if desired. As the two rotate, the blank and the tool are moved axially relative each other, so that the meshing teeth are drawn along each other. The tool and blank may be moved to bring their axes closer together, so that the teeth are tightly pressed upon each other. This results in a cutting of the surfaces of the blank teeth by the groove edges of the tool, the operation being somewhat similar to and, in a sense, lying between, filing and broaching.

The workpiece 101 shown in Figure 4 is a spur gear blank in which the teeth had been roughly cut, and the tool 102 is similar to that shown in Figure 3, excepting that its teeth are also parallel to its axis. The operation using this type of tool is exactly the same as is that of using the tool of Figure 3.

In Figures 1 and 2 a machine is shown having a base 5, adapted to stand upon the floor, which has upon its upper surface horizontal ways 6 upon which is slidably mounted a table or carriage 7. A shaft 8 is journalled in the base and may be driven by a belt applied to a pulley 9, a motor, or any other suitable driving means.

The shaft 8 is provided with a pinion 10 meshing with an idler 11, which, in turn, meshes with and drives a gear 12 also journalled within the base. The gear 12 carries a crank 13 journalled in a sliding block 14 which is arranged to reciprocate within a slot 15 formed in a sector 16, pivoted within the base upon a shaft 17. The upper end of the sector is provided with teeth 18 meshing with a rack 19 secured to the underside of the carriage 7, so that as the shaft 8 is rotated, the carriage will be caused to reciprocate along the ways.

A bevelled pinion carried by the shaft 8 meshes with a bevelled gear 20 secured to a shaft 21 carried by bearings within the base and parallel to the ways. The other end of this shaft is provided with a bevelled pinion 22 meshing with a bevelled gear 23 keyed to a vertical shaft 24. The upper end of the vertical shaft carries a bevelled pinion 25 meshing with another bevelled pinion 26 at the end of a horizontal shaft 27, the latter being secured in bearings upon the upper surface of the base. The shaft 27 has formed therein an elongated pinion 28 with which a gear 29 is in mesh. The gear 29 is secured to the end of a spindle 30 journalled on the carriage and adapted to carry the tool 2, the other end of the spindle being supported in a bearing 31 adjustably secured to the upper surface of the carriage.

Hence, as the carriage reciprocates, gear 29 may slide along pinion 28, but at all times the rotation of the pinion will be transmitted to the spindle. Suitable covers or guards 32 and 33 are attached to the carriage to protect the ways 6 and gears 25 and 26.

The base has formed integrally therewith an upwardly extending column 34 upon which are formed vertical ways 35. Slidable upon these ways is a slide or carriage 36, which may be manually moved up and down by a screw 37 operated by hand wheel 38. The lower end of the slide is provided with a stationary bearing 39 for supporting a center 40, while an adjustable tailstock 41 is mounted upon horizontal ways 42 formed upon the slide and arranged to be locked into position by a clamping bolt 43. This tailstock is provided with another center 44 and between these two centers is secured an arbor 45 upon which is clamped the work blank 1.

It will be readily apparent that as shaft 8 is rotated, the carriage is caused to slide back and forth and the tool spindle is continuously rotated. The rotation of the tool, of course, produces the rotation of the work gear with which it is in mesh, and the feed is accomplished by lowering the slide 36 by rotating handwheel 38 until the teeth of the blank have been cut to the desired extent.

While I have described the illustrated embodiment of my invention is some particularity, obviously many others will readily occur to those skilled in this art, and I do not, therefore, limit myself to the precise details shown and described but claim as my invention all embodiments, variations, and modifications thereof coming within the scope of the appended claim.

I claim:

A gear finishing machine comprising a base, horizontal guideways thereon, a table slidable on said guideways, a spindle journalled on said table, means for reciprocating the table along the guideways, gearing between said reciprocating means and said spindle, vertical guideways on said base, a carriage mounted on said vertical guideways, means for moving said carriage upon said guideways, and a spindle journalled on said carriage.

CHARLES H. SCHURR.